(12) United States Patent
Partee et al.

(10) Patent No.: US 7,586,710 B2
(45) Date of Patent: Sep. 8, 2009

(54) CONTROL OF TRANSDUCER TO TAPE SPACING

(75) Inventors: Charles Partee, Lyons, CO (US); John P. Nibarger, Superior, CO (US)

(73) Assignee: Sun Microsystems, Inc., Santa Clara, CA (US)

( * ) Notice: Subject to any disclaimer, the term of this patent is extended or adjusted under 35 U.S.C. 154(b) by 0 days.

(21) Appl. No.: 11/939,722

(22) Filed: Nov. 14, 2007

(65) Prior Publication Data

US 2009/0122436 A1    May 14, 2009

(51) Int. Cl.
G11B 21/02 (2006.01)
(52) U.S. Cl. .......................................... 360/75; 360/31
(58) Field of Classification Search .................. None
See application file for complete search history.

(56) References Cited

U.S. PATENT DOCUMENTS

| 5,991,113 | A | 11/1999 | Meyer et al. | |
|---|---|---|---|---|
| 6,441,990 | B2 | 8/2002 | Falace et al. | |
| 6,891,695 | B1 | 5/2005 | Falace et al. | |
| 7,097,110 | B2 * | 8/2006 | Sheperek et al. | 236/1 C |
| 2005/0152055 | A1 * | 7/2005 | Biskeborn | 360/31 |
| 2007/0035881 | A1 * | 2/2007 | Burbank et al. | 360/234.3 |
| 2008/0112076 | A1 * | 5/2008 | Biskeborn | 360/122 |

* cited by examiner

*Primary Examiner*—Jason C Olson
(74) *Attorney, Agent, or Firm*—Brooks Kushman P.C.

(57) ABSTRACT

A tape drive apparatus for reading and writing data on a magnetic tape includes at least one transducer that interacts with the magnetic tape. A temperature control element is positioned to thermally expand the transducer. A control system controls the amount of current supplied to the temperature control element. A sensing circuit senses the distance between the transducer and the data storage tape. The system generates a spacing signal indicative of the sensed distance and is stored as spacing data. A temperature control element is controlled based upon spacing data to adjust the spacing between the transducer and the tape. The temperature control element may be controlled based upon a fixed adjustment or empirical data. A method is disclosed for controlling spacing between the transducer and a magnetic storage tape by heating the transducer head to cause thermal expansion and reduce pole tip recession.

9 Claims, 4 Drawing Sheets

CONTROL OF TRANSDUCER TO TAPE SPACING

BACKGROUND OF THE INVENTION

1. Field of the Invention

The present invention relates to controlling the spacing of a tape drive transducer such as a read head, a write head, or a read/write head relative to a magnetic data storage tape.

2. Background Art

Tape drive manufacturers are constantly challenged to produce tape drives with larger storage capacity to meet market demands. One way to accomplish this objective is to increase the storage density in the magnetic layer of the tape. By increasing the storage density, the tape may have more tracks for a given area and each track may have more bits.

An important factor affecting the accuracy of the read/write processes is magnetic spacing. The distance between the magnetic layer on the tape where the information is recorded and the transducer, or transducers, that write and read data is referred to as magnetic spacing. Magnetic spacing is a critical parameter because the amplitude of a playback signal decreases exponentially with increasing magnetic spacing. The decrease in amplitude caused by increased magnetic spacing may be referred to as Wallace spacing loss. Increased magnetic spacing increases the width of the read back pulse which leads to reduced data densities. The quality of the write operation also varies with spacing and decreased magnetic spacing improves the quality of the write operation. Decreased magnetic spacing requires the head to be closer to a major surface area of the tape during operation.

Magnetic spacing for a tape drive is currently set in the factory and continually changes during long term operation. After a sufficient period of time, a steady-state magnetic spacing develops. Magnetic spacing is generally designed to be in the range between 20-50 nm, depending upon product requirements. Generally, smaller magnetic spacing is capable of supporting higher data densities for a given read/write accuracy, while greater magnetic spacing is capable of supporting lower data densities for a given read/write accuracy. If a system is designed to run at high data densities, but the magnetic spacing is too large, an unacceptable drop in read/write accuracy will occur.

Pole tip recession (PTR) occurs as a transducer pole wears over time causing the pole to recede away from the tape and into the head. Pole tip recession increases the magnetic spacing between the magnetic fields in the magnetic layer of the tape and the transducer in the head. Each transducer in a tape drive has a unique magnetic spacing. Different transducers wear at different rates. In addition, the location of a transducer may result in different rates of pole tip recession.

Tape drives are designed to accommodate pole tip recession and the resultant degradation in performance. The need to design for pole tip recession results in designing for lower data storage densities than could be supported if the degradation could be prevented. Tape drives must be designed to provide an adequate margin for differences in transducer wear rates and positions which necessitates designing tape drives that have lower data storage capacity than could be provided if reduced spacing could be assured between the pole tips of the transducer and the tape. Greater storage capacities could also be achieved if there was a reliable and effective way to compensate for pole tip recession as the tape drive is used over time.

These and other problems are addressed by Applicant's invention as summarized below.

SUMMARY OF THE INVENTION

According to one aspect of the invention, an adjustable head arrangement is provided that comprises a temperature control element, for example a resistive heating element, that is fabricated as part of the transducer. The temperature control element may be electrically connected to a pre-amp, or other control circuit, which may be installed inside or in close proximity to the transducer. Current is supplied by the pre-amp to energize the resistive element to cause the films making up the transducer head to be heated. The transducer head is enlarged as a result of thermal expansion thereby reducing the spacing between the transducer and the tape. In this manner, the resistive element is used to adjust the magnetic spacing. When the current is removed, the resistive element cools and the transducer moves away from the tape surface. The resistive element may be selectively activated during read and write operations to allow the transducer to remain relatively further away from the tape surface during other times, thereby reducing the possibility of further transducer recession due to additional wear caused by the tape contacting the transducer.

According to another aspect of the invention, a system for dynamically controlling magnetic tape spacing between a transducer and a data storage tape is provided. A tape head of the data storage tape drive includes the transducer. A sensing circuit is provided for sensing the distance between the transducer and the data storage tape. The sensing circuit generates a spacing signal that is indicative of the sensed distance which is stored as spacing data. A temperature control element is operatively connected to the tape head. The temperature control element is controlled based upon the spacing data which controls the temperature of a portion of the tape head. The temperature is controlled to adjust the distance between the transducer and the data storage tape.

According to another aspect of the invention, a tape drive apparatus is provided that includes a transducer positioned to interact with a magnetic tape. A temperature control element is positioned to thermally expand the transducer. A control system provides current to the temperature control element for expanding the transducer and thereby controls the spacing between the transducer and the magnetic tape.

According to another aspect of the present invention, a method of controlling the spacing between a transducer head and a magnetic storage tape is provided. The method includes the steps of determining the instantaneous spacing between the transducer head and a magnetic storage tape. A control signal is generated that is used to develop a spacing value that is indicative of the spacing between the transducer head and the magnetic storage tape. Current is provided to a resistance heating element based upon the spacing value. The transducer head is heated to selectively cause thermal expansion of the transducer head which reduces the spacing between the transducer head and the magnetic storage tape.

According to other aspects of the method of the present invention, the heating step may be performed during only selected read/write operations of the transducer.

According to other aspects of the method, the step of determining the instantaneous spacing may be used to sense the extent of pole tip recession. The determining step may further comprise taking a read back amplitude measurement. The read back amplitude measurement may be taken repeatedly and the current provided to the resistance heating element may be increased incrementally until the read back amplitude reaches a plateau. During the determining step, the instantaneous magnetic clearance may be determined by the equation:

$$V = V_0 e^{(-2\pi d/\lambda)}$$

where V is the instantaneous amplitude, $V_0$ is the amplitude at d=0, e is the exponential function, d is the distance between the magnetic layer and the read transducer, and $\lambda$ is the signal wavelength, wherein the amplitude of a read back signal is calculated based upon the known wavelength.

The spacing between the head and tape may be measured and then stored for periodically energizing the resistive heating element to reduce the spacing between the transducer and the tape.

These aspects of the invention and other features will be apparent to one of ordinary skill in the art in view of the attached drawings and the following detailed description of the illustrated embodiments.

DETAILED DESCRIPTION OF THE PREFERRED EMBODIMENT(S)

Figure 1:
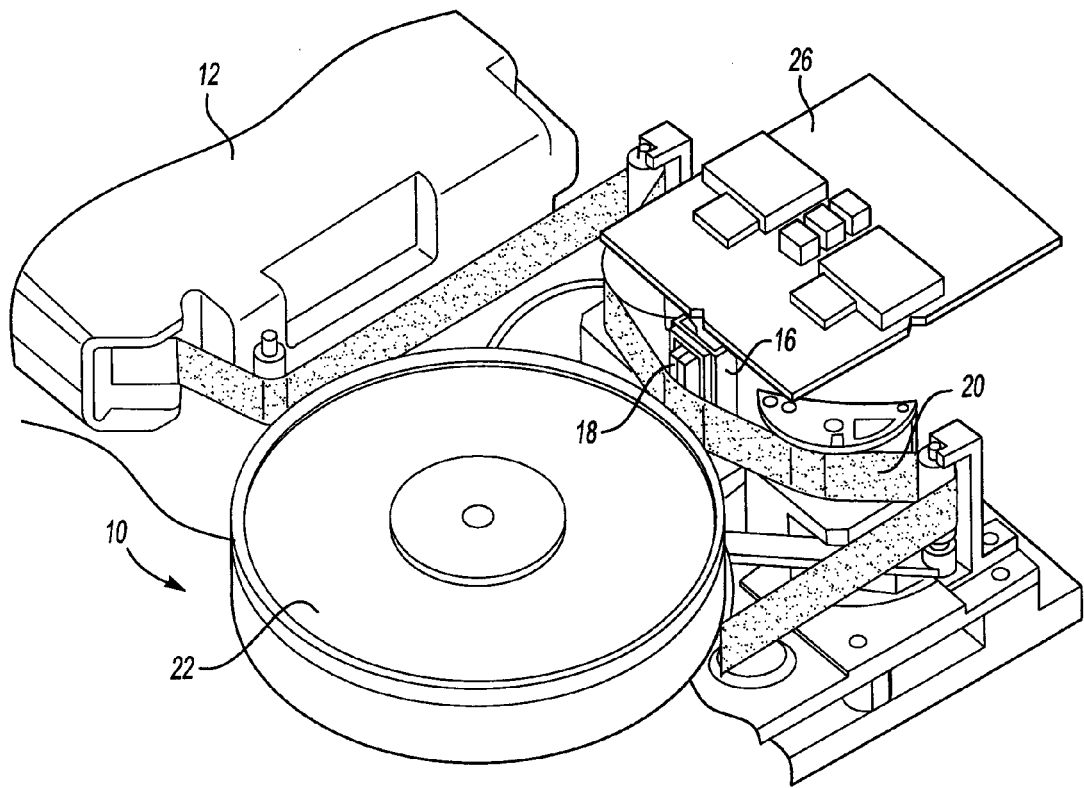
FIG. 1 is a fragmentary perspective view of a tape drive.

Referring to FIG. 1, a tape drive 10 is shown with a tape cartridge 12 loaded into the tape drive 10. The tape drive 10 includes a tape head assembly 16. Part of the tape head assembly is a transducer 18 that may be a read/write head, a read head, or a write head. The transducer 18 may also comprise a plurality of transducers that are used to read and write data on a magnetic tape 20. The magnetic tape 20 is fed onto a take-up reel 22 that takes up the magnetic tape that is fed from the tape cartridge 12 after it is fed across the tape head assembly 16. A transducer circuit board 26 is shown installed above the tape head assembly 16. The transducer circuit board 26 is used to control the operation of the tape head assembly 16 and may also include a temperature control circuit that is used for controlling pole tip recession.

Figure 2:
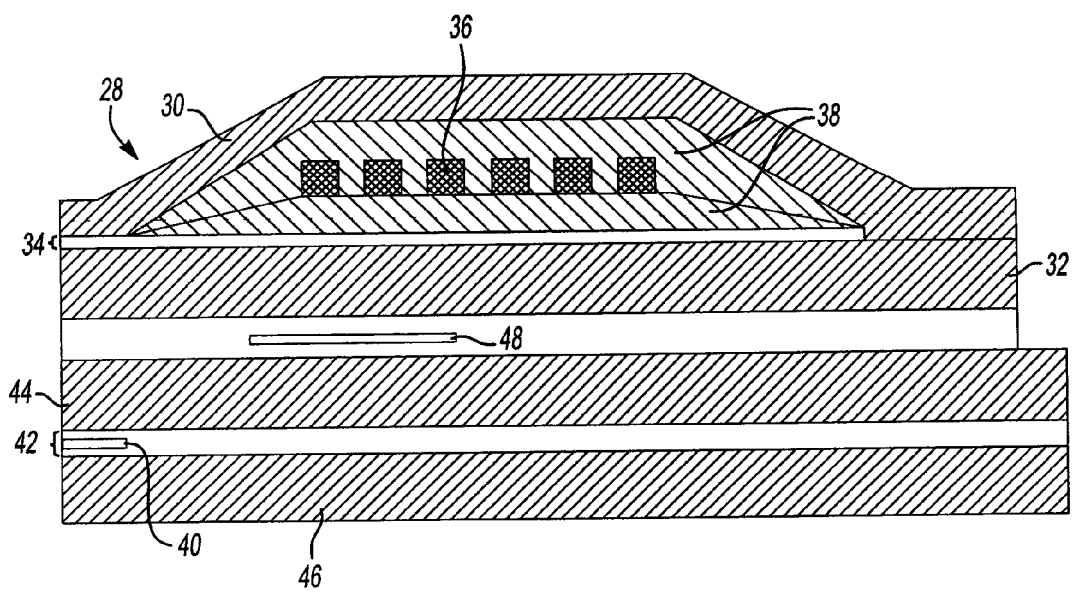
FIG. 2 is a schematic cross-sectional view of a combined read/write head transducer having a resistive heating element.

Referring to FIG. 2, a read/write transducer 28 is shown to include a top pole 30 and a bottom pole 32 that define a write gap 34. For clarity, the write gap 34 is not cross hatched, but should be understood as being filled with an insulator, such as alumina. The top and bottom poles 30 and 32 are controlled to write data on a magnetic tape, as shown in FIG. 1, changing the status of data bits on the magnetic tape. A plurality of coils 36 are provided between the top pole 30 and bottom pole 32 that are embedded in one or more installation layers 38. The coils 36 are energized to write data on the tape 20. A magneto-resistive sensor (MR sensor) 40 is preferably the same magneto-resistive sensor 40 that is used to read data from the tape. The sensor 40 may be operated in a spacing detection mode wherein a signal of known wavelength is read with the amplitude of the signal being measured to determine the degree of pole tip recession by determining the extent to which current provided to a heating element in the head can increase the amplitude of the known wavelength signal until the amplitude plateaus.

The MR sensor 40 is disposed in the read gap 42 defined by the top shield 44 and the bottom shield 46. The read gap 42 is also filled with alumina. A resistance heating element 48 is shown disposed in the read/write transducer 28 between the bottom pole 32 and the top shield 44. The heating element 48 is encased in an insulative layer, such as alumina. The read/write transducer 28 is a combined write transducer portion comprising the top pole 30, coils 36 and bottom pole 32 and a read transducer portion is the bottom shield 46, top shield 44 and the MR sensor 40. Separate read transducers and write transducers may also be provided. The structure of the resistance heating element 48 will be described with reference to FIG. 3 below.

Figure 3:
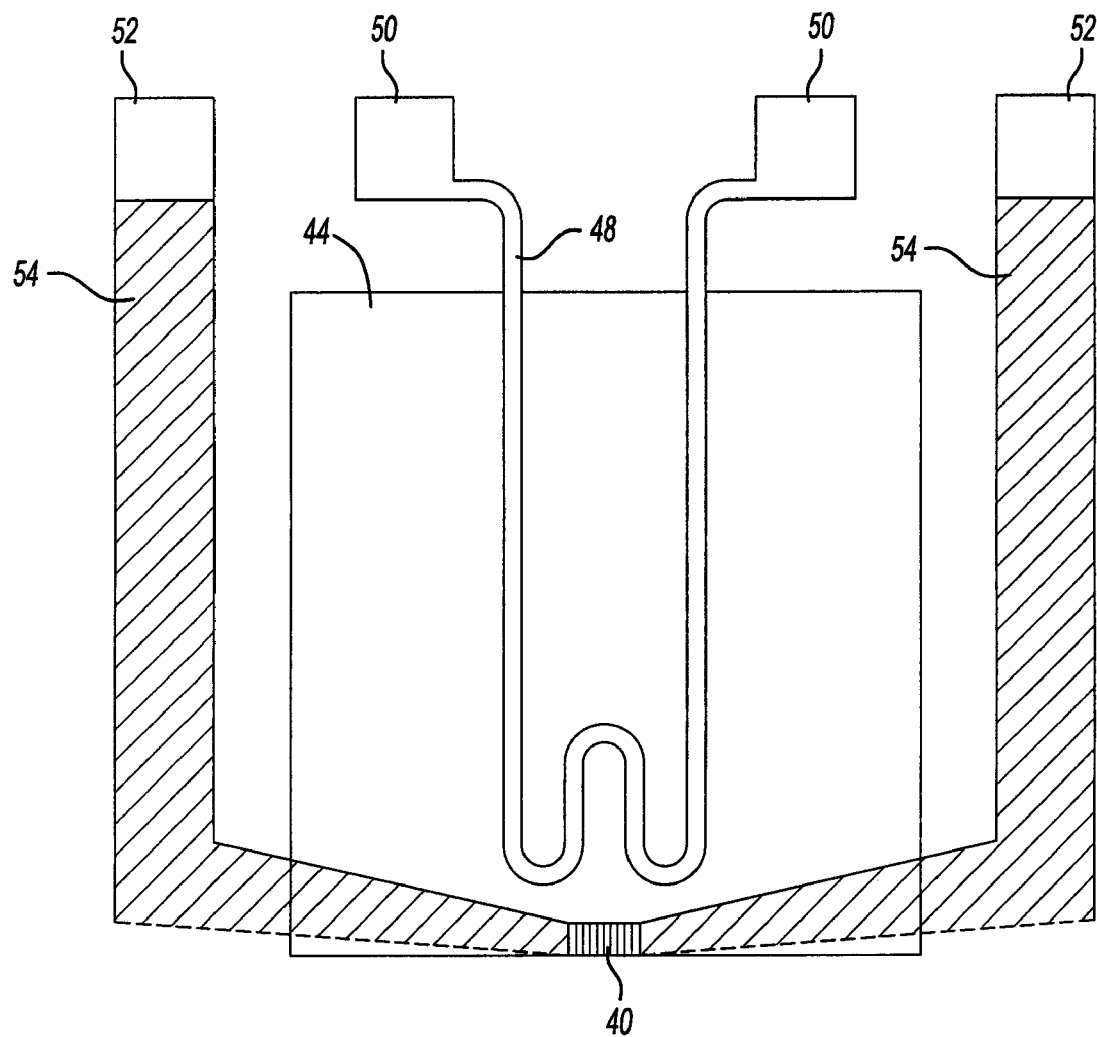
FIG. 3 is a schematic cross-sectional view of a read/write head having a resistive heating element.

Referring to FIG. 3, the resistance heating element 48 is shown to include heater connection pads 50 to which the heating element 48 is connected to a control circuit. The MR sensor 40 includes MR connection pads 52 that are connected by MR leads 54 to the MR sensor 40. The MR sensor 40 and resistance heating element 48 are shown disposed on top of the top shield 44. The structure and operation of another embodiment of read/write transducer 28' is described with reference to FIG. 4A through FIG. 4D below.

Figure 4A:
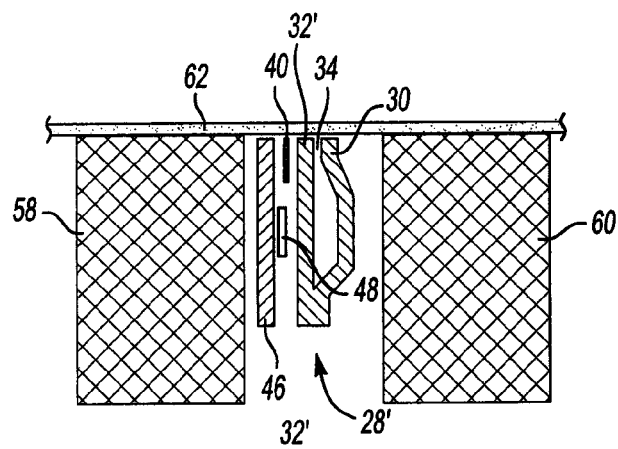
FIG. 4A is a diagrammatic cross-sectional view of a merged pole transducer including a heating element as manufactured according to the present invention.

Referring to FIG. 4A, the read/write transducer 28' is diagrammatically shown between a substrate 58 and a closure 60. The substrate 58 and closure 60 are formed of AlTiC ceramic that form part of the tape head assembly 16. The read/write transducer 28' includes a top pole 30 and a merged bottom pole/shield 32' that together define the write gap 34 of the "write" portion of the read/write transducer. A bottom pole/shield 32' and shield 46 are disposed on opposite sides of the MR sensor 40. The resistance heating element 48 is assembled to the bottom pole/shield 32' as the tape head assembly is formed in a layering process. A rough lapping tape 62 is used finish forming the substrate 58 and closure 60 as well as the pole tip ends of the read/write transducer 28'.

Figure 4B:
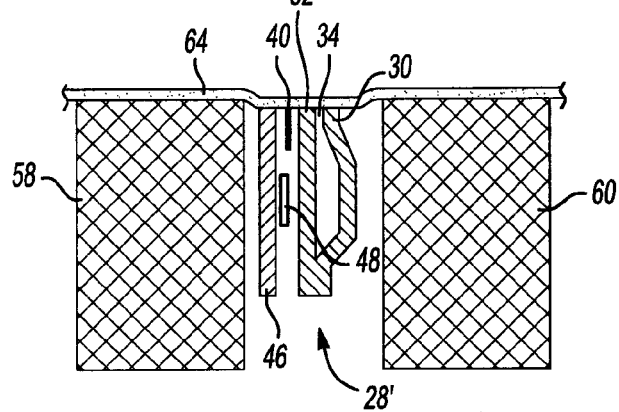
FIG. 4B is a diagrammatic cross-sectional view of a merged pole transducer made according to the present invention as finish lapped to set the position of the poles as manufactured.

Referring to FIG. 4B, the substrate 58, closure 60 and pole tip ends of the read/write transducer 28' are lapped by finish lapping tape 64 that laps the read/write transducer 28' until it is slightly recessed relative to the substrate 58 and closure 60. The finish lapping tape is used to set the pole tip location during the manufacturing process.

Figure 4C:
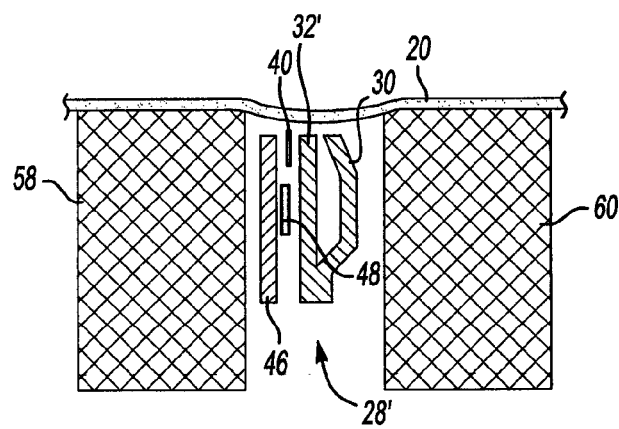
FIG. 4C is a diagrammatic cross-sectional view of a merged pole transducer made according to the present invention after wear over time has created increased pole tip recession.

FIG. 4C illustrates in the exaggerated manner the phenomenon of pole tip recession wherein the magnetic tape 20 is shown having worn the pole tip ends of the read/write transducer 28' to an extent at which the tips of the read/write transducer 28' are substantially more recessed relative to the substrate 58 and closure 60 when compared to the as-manufactured condition illustrated in FIG. 4B.

Figure 4D:
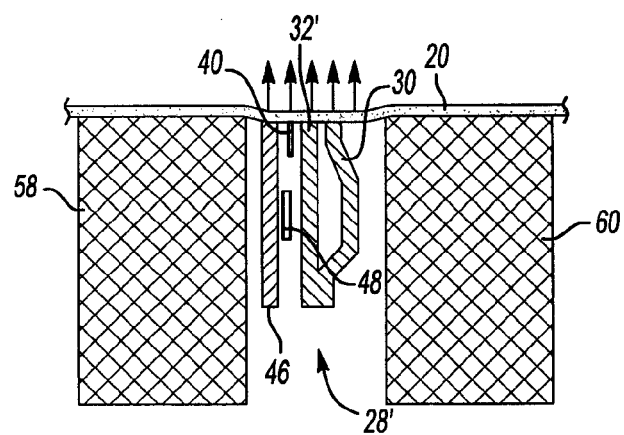
FIG. 4D is a diagrammatic cross-sectional view of a merged pole transducer made according to the present invention wherein heat is provided by the resistive heating element to thermally expand the transducer.

Referring to FIG. 4D, the resistance heating element 48 has been energized to cause thermal expansion of the read/write transducer 28' wherein the poles of the read/write transducer 28' are expanded to move toward the tape 20 thereby adjusting for pole tip recession. The resistance heating element 48 heats the shield 46, bottom pole/shield 32' and top pole 30 along with the surrounding structure to expand in the direction indicated by the five directional arrows located on the opposite side of the magnetic tape 20 from the read/write transducer 28'. In this position, the head is adjusted to compensate for pole tip recession as the result of the thermal expansion.

Figure 5:
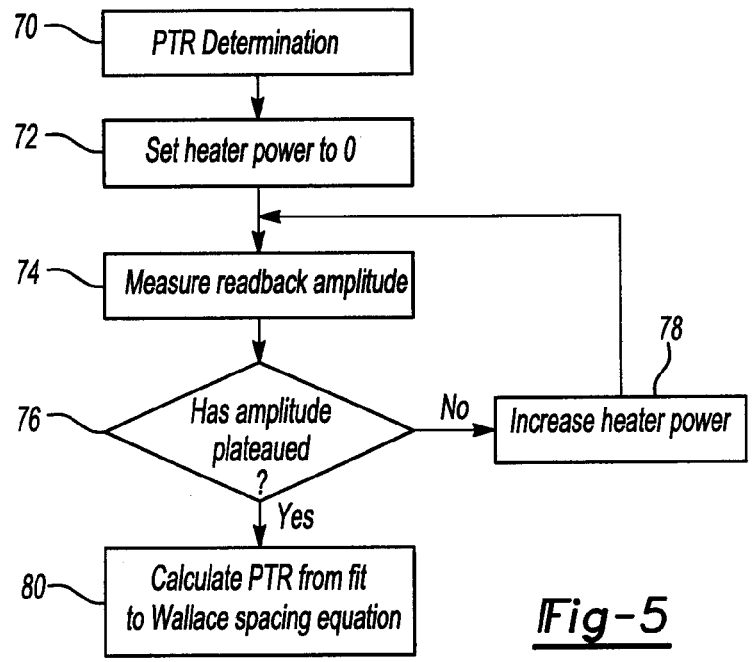
FIG. 5 is a flowchart illustrating the steps in the process of adjusting the temperature of the transducer to compensate for pole tip recession.

Referring to FIG. 5, pole tip recession determination may be determined, at 70, as follows. The heater power is initially set to zero at 72. A signal of known wavelength is incident on the MR sensor 40 and the amplitude of the signal that is read back is measured at 74. A control circuit determines whether the amplitude of the read back signal is plateaued, meaning that the next prior amplitude signal is greater than or equal to the current measured read back amplitude at 76. If the read back amplitude has not plateaued, the controller generates a signal to increase heater power at 78 and the system again measures read back amplitude until it is determined that the read back amplitude has plateaued at 76. Once the read back amplitude plateaus, the pole tip recession is calculated according to the Wallace spacing loss equation at 80. The Wallace spacing loss equation is described further below.

The Wallace spacing loss equation, $V=V_0 e^{(-2\pi d/\lambda)}$ where V is the instantaneous amplitude, $V_0$ is the amplitude at d=0, e is the exponential function, d is the distance between the magnetic layer and the read transducer, and $\lambda$ is the signal wavelength, can be used to determine the instantaneous magnetic clearance. The heater is successively energized at increasing power levels, reducing the magnetic spacing, while the amplitude of the read back signal is measured. The magnetic spacing is progressively reduced until the amplitude of the signal no longer increases. This defines V at d=0 and the remaining variables can be fit to the Wallace spacing equation. The PTR can be assumed to be the magnetic spacing when the heater is not energized minus the generally approximately well-known thickness of the overcoat layers on the tape. This procedure is completed for each head during the drive test process and the resulting PTR value is stored.

During write and read back, the heater element is energized to decrease the PTR to the desired value, such as 0-10 nm, to improve the writing and reading performance. During seeking or other operations that do not require reading and writing, current may not be provided to the heater.

The heater element 48 may be constantly energized to reduce spacing loss. Since the amplitude plateaus as described with reference to FIG. 6 below, the resistance heating element 48 may be always energized during read or write operations to minimize spacing. Alternatively, the spacing may be dynamically adjusted based upon instantaneous spacing determinations or periodically adjusted based upon stored spacing data. In addition, a look-up table could be provided that would include a table of predicted PTR values based upon empirical testing or historical data.

Figure 6:
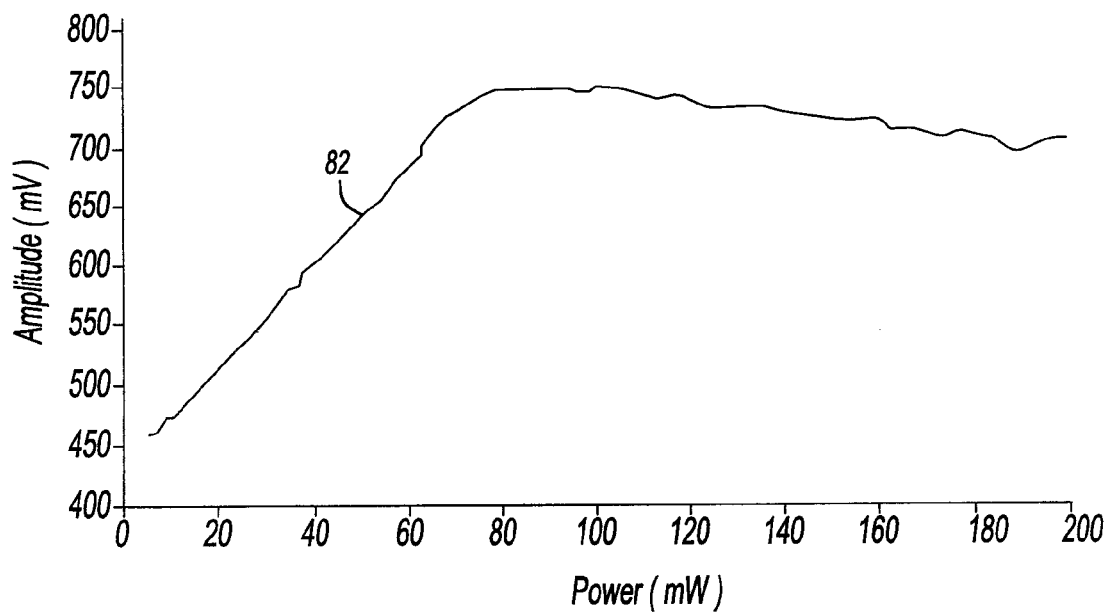
FIG. 6 is a graph showing the power applied to the transducer heater and its effect on the amplitude of a read back signal of known frequency.

Referring to FIG. 6, the invention is illustrated by reference to a chart that compares the power supplied to a heating element to the read back amplitude. Power is supplied to the heater element. For example, at 40 mW, the amplitude is less than 600 mV as indicated by line 82 which indicates amplitude as a function of power. If the power is increased to 80 mW, a maximum amplitude of 750 mV is achieved. Thereafter, as power is increased from 80 to 200 mW, the amplitude plateaus or slightly recedes from 750 mV to about 700 mV. For the transducer that is the subject of the chart of FIG. 6, power would preferably be set to 80 mW or more to maximize read back amplitude. Additional power provided above 80 mW does not significantly change the read back amplitude. Read back amplitude is in this case referred to as being plateaued.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A system for dynamically controlling magnetic spacing between a transducer and a data storage tape comprising:
   a data storage tape drive that has a tape head that includes the transducer;
   a sensing circuit for measuring instantaneous magnetic clearance between the transducer and the data storage tape by determining the amplitude of a read back signal for a signal of known wavelength, wherein the sensing circuit measures instantaneous magnetic clearance by determining the equation:

$$V=V_0 e^{(-2\pi d/\lambda)}$$

where V is the instantaneous amplitude, $V_0$ is the amplitude at d=0, e is the exponential function, d is the distance between the magnetic layer and the read transducer, and $\lambda$ is the signal wavelength, and generating a spacing signal indicative of the measured clearance that is stored as spacing data; and
   a temperature control element operatively connected to the tape head that is controlled based upon the spacing data to control the temperature of a portion of the tape head, wherein the temperature is controlled to adjust the distance between the transducer and the data storage tape.

2. The system of claim 1 wherein the temperature control element is a heating element.

3. The system of claim 1 wherein the sensing circuit utilizes the transducer in a read back mode.

4. The system of claim 1 wherein the sensing circuit includes a sensor.

5. The system of claim 1 wherein the temperature control element is used to control the temperature of the portion of the tape head selectively during read/write operation of the read/write transducer.

6. The system of claim 1 wherein the temperature control element is a resistance heater that is assembled as part of the read/write transducer, wherein the resistance heater is connected to a pre-amplifier that provides current to the resistance heater based upon the spacing data.

7. The system of claim 1 wherein the sensing circuit measures instantaneous magnetic clearance by determining the equation:

$$V=V_0 e^{(-2\pi d/\lambda)}$$

where V is the instantaneous amplitude, $V_0$ is the amplitude at d=0, e is the exponential function, d is the distance between the magnetic layer and the read transducer, and $\lambda$ is the signal wavelength.

8. A method of controlling the spacing between a transducer head and a magnetic storage tape comprising:
   determining the instantaneous spacing between the transducer head and the magnetic storage tape wherein during the determining step, the instantaneous magnetic clearance is determined by the equation:

$$V=V_0 e^{(-2\pi d/\lambda)}$$

where V is the instantaneous amplitude, $V_0$ is the amplitude at d=0, e is the exponential function, d is the distance between the magnetic layer and the read transducer, and $\lambda$ is the signal wavelength, wherein the amplitude of a read back signal of known wave length is determined generating a control signal that is used to develop a spacing value that is indicative of the spacing between the transducer head and the magnetic storage tape;

providing current to a resistance heating element based upon the spacing value; and heating the transducer head to selectively cause thermal expansion of the transducer head to reduce the spacing between the transducer head and the magnetic storage tape.

9. The method of claim 8 wherein the step of determining the instantaneous spacing is used to sense the extent of pole tip recession.

* * * * *